US009359656B2

(12) United States Patent
Dry

(10) Patent No.: US 9,359,656 B2
(45) Date of Patent: Jun. 7, 2016

(54) DIRECT SMELTING PROCESS

(75) Inventor: Rodney James Dry, City Beach (AU)

(73) Assignee: Technological Resources Pty. Limited, Melbourne, Victoria (AU)

( * ) Notice: Subject to any disclaimer, the term of this patent is extended or adjusted under 35 U.S.C. 154(b) by 24 days.

(21) Appl. No.: 13/994,533

(22) PCT Filed: Feb. 9, 2012

(86) PCT No.: PCT/AU2012/000125
§ 371 (c)(1),
(2), (4) Date: Aug. 28, 2013

(87) PCT Pub. No.: WO2012/106769
PCT Pub. Date: Aug. 16, 2012

(65) Prior Publication Data
US 2013/0333523 A1 Dec. 19, 2013

(30) Foreign Application Priority Data
Feb. 9, 2011 (AU) ................................ 2011900420

(51) Int. Cl.
C21B 13/00 (2006.01)
C22B 5/00 (2006.01)
F27B 3/02 (2006.01)
F27B 3/22 (2006.01)
F27D 3/18 (2006.01)
(Continued)

(52) U.S. Cl.
CPC .............. *C22B 5/00* (2013.01); *C21B 13/0006* (2013.01); *C21B 13/0013* (2013.01); *C21B 13/0026* (2013.01); *C21C 5/56* (2013.01); *C21C 7/0037* (2013.01); *F27B 3/02* (2013.01); *F27B 3/225* (2013.01); *F27D 3/18* (2013.01); *Y02P 10/136* (2015.11)

(58) Field of Classification Search
CPC ....................... C21B 13/0013; C21B 13/0026
See application file for complete search history.

(56) References Cited

U.S. PATENT DOCUMENTS 6,423,115 B1 * 7/2002 McCarthy et al. .............. 75/414
6,428,603 B1 * 8/2002 Batterham ...................... 75/533
(Continued)

FOREIGN PATENT DOCUMENTS

| SU | 1740433 A1 | 6/1992 |
| WO | 9631627 A1 | 10/1996 |
| WO | 2006/010210 A1 | 2/2006 |
| WO | 2010/088740 A1 | 8/2010 |

OTHER PUBLICATIONS

International Search Report mailed Mar. 27, 2012 (PCT/AU2012/000125); ISA/AU.

(Continued)

*Primary Examiner* — George Wyszomierski
*Assistant Examiner* — Tima M McGuthry Banks
(74) *Attorney, Agent, or Firm* — Banner & Witcoff, Ltd.

(57) ABSTRACT

A molten bath-based process for direct smelting metalliferous material and producing molten metal in a direct smelting vessel that contains a molten bath that has a metal layer that is at least 900 mm deep. The process includes selecting operating parameters of the process so that feed material (solid material and carrier gas) is injected from above the metal layer into the metal layer via at least one solids injection lance with sufficient momentum to penetrate to a depth of at least 100 mm below a nominal quiescent surface of the metal layer to cause upward movement of molten material and gas from the metal layer.

22 Claims, 3 Drawing Sheets

(51) Int. Cl.
  *C21C 5/56* (2006.01)
  *C21C 7/00* (2006.01)

(56) References Cited

U.S. PATENT DOCUMENTS

| | | | |
|---|---|---|---|
| 6,989,042 | B2 | 1/2006 | Dry et al. |
| 7,445,747 | B2 | 11/2008 | Williams et al. |
| 2004/0031355 | A1* | 2/2004 | Dry et al. ......... 75/502 |
| 2009/0014928 | A1* | 1/2009 | Williams ......... 266/225 |
| 2011/0308354 | A1* | 12/2011 | Dry ......... 75/707 |
| 2012/0067171 | A1* | 3/2012 | Pilote et al. ......... 75/707 |

OTHER PUBLICATIONS

Irons, G.A., 1992. "Fundamental Aspects of Solids Injection for Bath Smelting", Savard/Lee International Symposium on Bath Smelting, Oct. 18-22, Montreal, QC, The Metallurgical Society and The Iron and Steel Society of AIME, and CIM pp. 493-506.

G A Irons and L R Farias, The Influence of Lance Orientation and Gas Evolution on Particle-Liquid Contact During Submerged Power Injection, Canadian Metallurgical Quarterly, vol. 25, No. 4, pp. 297-306, 1986.

L R Farias and G A Irons, A Unified Approach to Bubbling-Jetting Phenomena in Powder Injection into Iron and Steel, Metallurgical Transactions B, vol. 16B, Jun. 1985, pp. 211-225.

* cited by examiner

1. Internal diameter of injectuion tube (in mm)
2. Outside diameter of injectuion lance (in mm)
3. Length of tube of the diameter in (1) above
4. Lance angle: 90° = vertical, 0 = horizontal
5. Pressure above the slag layer (kPa gauge)
6. Temperature of gas-solid mixture at lance tip
7. Conveying gas rate (nitrogen) in 1000 Nm³/h
8. Vertical distance from clean lance tip to metal
9. Vertical height of "elephant trunk" on lance tip
10. Height of slag above the tip of the lance
11. Density of metal (bubble-free condition)
12. Density of slag (bubble-containing condition)
13. Slag surface tension (for regime type calc)
14. McMaster model parameter (fixed value)
15. McMaster setting (fixed value)
16. McMaster setting (fixed value)

32 Explanation A
33 Explanation B
34 Explanation C

| Field | Value |
|---|---|
| Case Folder | \\hottie01.corp.riotinto.org/mydocs$\v_diy\M_Plant\Technical\ISR\Injection Plumes\McMaster Injection Plume Calcs\GlJet Calcs |
| Case Name | Typical Injection Conditions |
| Lance Tube ID (mm) | 150 |
| Lance Tube OD (mm) | 330 |
| Lance Tube Length (m) | 6.0 |
| Angle to Horizontal (deg) | 60.0 |
| SRV Topspace Pressure (kPa g) | 80 |
| Temp in Lance (deg C) | 180 |
| Total Nitrogen Rate (kNm³/h) | 6.000 |
| Clean Lance to Metal (mm vertical) | 760 |
| Elephant Trunk Height (mm vertical) | 100 |
| Lance Tip Immersion (mm vertical) | 2000 |
| Metal Density (kg/m3) | 6800 |
| Slag Density (kg/m3) | 1300 |
| Slag Surface Tension (kg/s2) | 1.0 |
| Liquid Entrainment Factor | 0.060 |
| Total Simulation Steps | 2000 |
| Step Increments (mm) | 10.0 |
| Acceleration Time Factor | 2.00 |

| Coal | |
|---|---|
| Coal Rate (tonne/h) | 30.0 |
| Coal Fraction < 45 micron | 13.0 |
| Coal 50% < Size (mm) | 0.200 |
| Coal 80% < Size (mm) | 0.600 |
| Coal Particle Density (kg/m3) | 1200 |

| Ore | |
|---|---|
| Ore Rate (tonne/h) | 60.0 |
| Ore Fraction < 45 micron | 10.0 |
| Ore 50% < Size (mm) | 0.900 |
| Ore 80% < Size (mm) | 3.200 |
| Ore Particle Density (kg/m3) | 5200 |

| Flux | |
|---|---|
| Flux Rate (tonne/h) | 5.0 |
| Flux Fraction < 45 micron | 50.0 |
| Flux 50% < Size (mm) | 0.045 |
| Flux 80% < Size (mm) | 0.100 |
| Flux Particle Density (kg/m3) | 2000 |

☑ Generate Gas Bubbles in Target Zone   ☑ Use Auto Acceleration Percentage
Voidage in Target Zone (%)  50.0   Solids Percent of Gas Velocity  50.7

Simulation Complete
Integration Successful    [Solve]

17. Coal feed rate to lance (tonne/h)
18. Percentage of particles smaller than 45 micron
19. Size at which 50 wt% of particles are smaller
20. Size at which 80 wt% of particles are smaller
21. Effective particle density (including internal porosity)
22. Iron ore feed rate to lance (tonne/h)
23. Percentage of particles smaller than 45 micron
24. Size at which 50 wt% of particles are smaller
25. Size at which 80 wt% of particles are smaller
26. Effective particle density (including internal porosity)
27. Flux feed rate to lance (tonne/h)
28. Percentage of particles smaller than 45 micron
29. Size at which 50 wt% of particles are smaller
30. Size at which 80 wt% of particles are smaller
31. Effective particle density (including internal porosity)

35 Explanation D
36 Explanation E

FIG. 2: Model Input Parameters

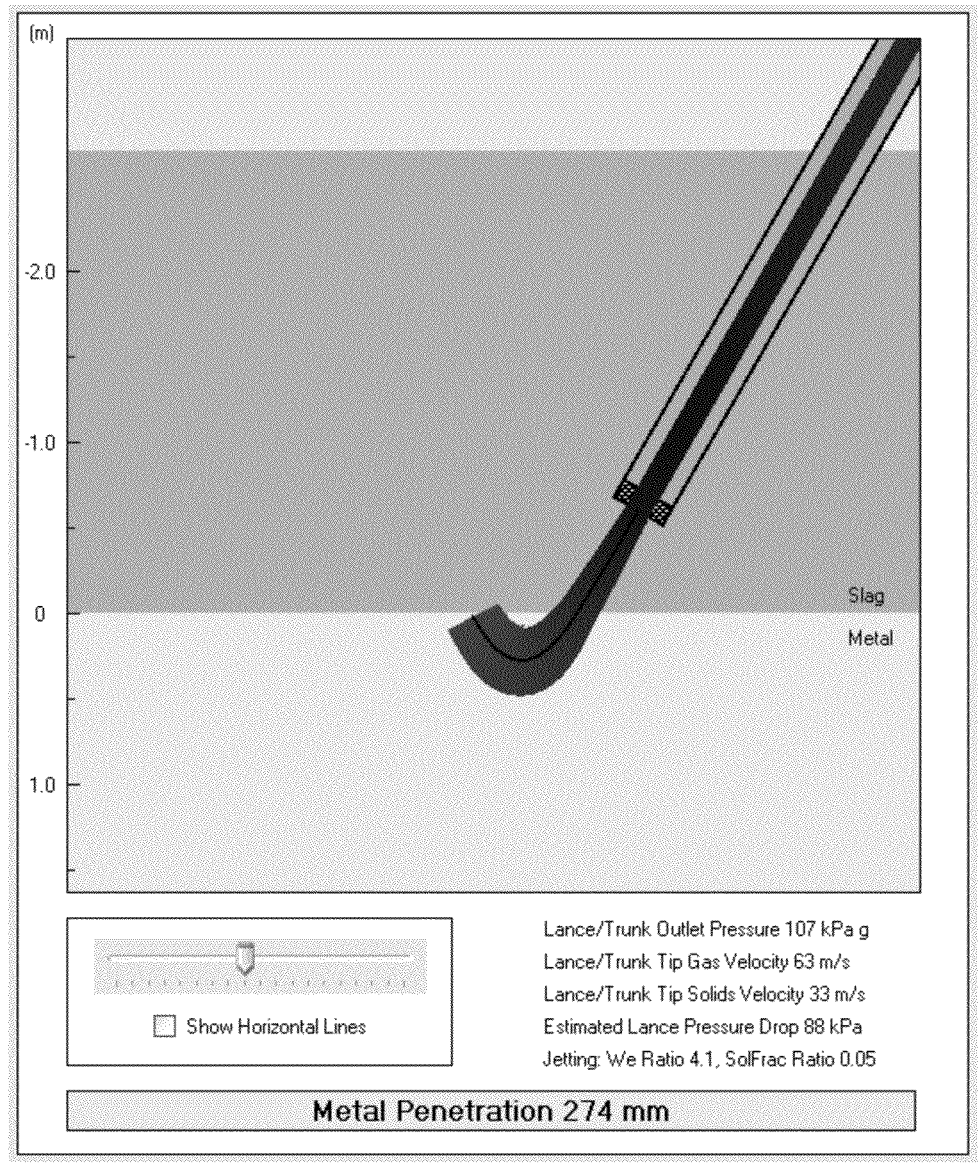
FIG. 3: Model Results

DIRECT SMELTING PROCESS

The present application is a U.S. National Phase filing of International Application No. PCT/AU2012/000125, filed on Feb. 9, 2012, designating the United States of America and claiming priority to Australia Patent Application No. 2011900420, filed Feb. 9, 2011, and this application claims priority to and the benefit of both the above-identified applications, which are both incorporated by reference herein in their entireties.

TECHNICAL FIELD

The present invention relates to a molten bath-based process for direct smelting a metalliferous material.

In particular, the present invention relates to the parameters required for injecting solid material into a molten bath in a molten bath-based process for direct smelting a metalliferous material in accordance with the invention.

BACKGROUND

A known direct smelting process for a metalliferous material, which relies principally on a molten bath as a smelting medium, and is generally referred to as the HIsmelt process, is described in International application PCT/AU96/00197 (WO 96/31627) in the name of the applicant.

The HIsmelt process as described in the International application in the context of direct smelting a metalliferous material in the form of iron oxides and producing molten iron includes the steps of:

(a) forming a bath of molten iron and slag in a direct smelting vessel;

(b) injecting into the bath: (i) metalliferous material, typically iron oxides; and (ii) solid carbonaceous material, typically coal, which acts as a reductant of the iron oxides and a source of energy; and (c) smelting metalliferous material to iron in the molten bath.

The term "smelting" is herein understood to mean thermal processing wherein chemical reactions that reduce metal oxides take place to produce molten metal.

The HIsmelt process also includes post-combusting reaction gases, such as CO and $H_2$ released from the bath, in the space above the bath with oxygen-containing gas, typically air, and transferring the heat generated by the post-combustion to the bath to contribute to the thermal energy required to smelt the metalliferous materials.

The HIsmelt process also includes forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process metalliferous material and solid carbonaceous material are injected into a molten bath through a number of solids injection lances (sometimes referred to as "tuyeres") which are inclined to the vertical so as to extend downwardly and inwardly through a side wall of a direct smelting vessel and into a lower region of the vessel so as to deliver at least part of the solids material into a molten metal layer in the bottom of the vessel. To promote the post-combustion of reaction gases in an upper part of the vessel, a blast of hot air, which may be oxygen-enriched, is injected into an upper region of the vessel through a downwardly extending hot air injection lance. Off gases resulting from post-combustion of reaction gases in the vessel are taken away from the upper region of the vessel through an off gas duct. The vessel includes refractory-lined water cooled panels in the side wall and the roof of the vessel, and water is circulated continuously through the panels in a continuous circuit.

The HIsmelt process enables large quantities of molten iron to be produced by direct smelting of metalliferous material in a molten bath. To enable such levels of production, large quantities of both metalliferous material and carbonaceous material must be supplied to the vessel.

The above description is not to be taken as an admission of the common general knowledge in Australia or elsewhere.

U.S. Pat. No. 6,989,042 in the name of the applicant discloses parameters for injecting feed materials (solid material and carrier gas) into a molten bath via solids injecting lances in the HIsmelt process. These parameters include injection velocity, lance diameter, lance orientation, and superficial gas flow from the metal layer as a consequence of the solids injection.

Specifically, claim 1 of the US patent defines the steps of a direct smelting process for producing metals which term includes metal alloys from a ferrous material which includes the steps of:

(a) forming a bath of molten metal and molten slag in a metallurgical vessel;

(b) injecting feed materials being solid material and carrier gas into the molten bath at a velocity of at least 40 m/s through a downwardly extending solids injection lance having a delivery tube of internal diameter of 40-200 mm that is located so that a central axis of an outlet end of the lance is at an angle of 20 to 90 degrees to a horizontal axis and generating a superficial gas flow of at least 0.04 $Nm^3/s/m^2$ within the molten bath (where $m^2$ relates to the area of a horizontal cross-section through the molten bath) at least in part by reactions of injected material in the bath which causes molten metal to be projected upwards as splashes, droplets and streams and form an expanded molten bath zone, the gas flow and the upwardly projected molten material causing substantial movement of material within the molten bath and strong mixing of the molten bath, the feed materials being selected so that, in an overall sense, the reactions of the feed materials in the molten bath are endothermic; and (c) injecting an oxygen-containing gas into an upper region of the vessel via at least one oxygen gas injection lance and post-combusting combustible gases released from the molten bath, whereby ascending and thereafter descending molten material in the expanded molten bath zone facilitate heat transfer to the molten bath.

The applicant has determined that achieving the required extent of upward flow of molten material from the metal layer is a difficult issue as the size of direct smelting vessels increases. In particular, in a vessel with an equivalent hearth diameter of 6 m or more, the mixing requirement is significantly more difficult to achieve than is the case with a smaller vessel at roughly half this equivalent diameter. Moreover, the applicant has determined that achieving the required extent of upward flow of molten material from the metal layer is critical to stable and cost effective operation of the HIsmelt process at the larger scale.

The applicant has realised that the required extent of upward flow of molten material can be achieved by selecting the operating parameters for the HIsmelt process so that feed material (solid material and carrier gas) for the process have sufficient momentum to penetrate to a depth of at least 100 mm into a metal layer of a molten bath that is at least 900 mm deep.

Numerical calculation to achieve a given penetration depth into the metal layer is not an exact science. Different penetration depths can be calculated (for nominally the same conditions) using different calculation assumptions and methods. For the purpose of clarifying the meaning of the term "penetration depth", a standard calculation method based on a model from McMaster University in Canada has been adopted. Details of this model are given in the appendix, and the model itself is freely available. The term "penetration depth" as used here is implicitly defined as the depth of penetration calculated using the McMaster model as described in the appendix. Hence, the reference to penetrating at least 100 mm into the metal layer of the molten bath in the preceding paragraph means a penetration depth of at least 100 mm as calculated using the McMaster model as described in the appendix.

The present invention provides a molten bath-based process for direct smelting metalliferous material and producing molten metal in a direct smelting vessel that contains a molten bath that has a metal layer that is at least 900 mm deep includes selecting operating parameters of the process so that feed material including solid material and carrier gas is injected from above the metal layer into the metal layer via at least one solids injection lance with sufficient momentum to penetrate to a depth of at least 100 mm below a nominal quiescent surface of the metal layer to cause upward movement of molten material and gas from the metal layer.

The operating parameters for the process to provide feed material with sufficient momentum may include injecting feed material with a lance pressure drop of at least 1 bar in the solids injection lance or lances.

The lance pressure drop in the solids injection lance or lances is a measure of the acceleration and therefore the momentum and/or velocity of feed material through the solids injection lance or each solids injection lance.

The term "lance pressure drop" is understood herein to mean the pressure drop from a point (A) upstream of the lance and the "acceleration section" of the lance (see below) where gas velocity is at least a factor of 2 lower than that at the outlet lance tip to (B) the outlet lance tip itself. In many cases pressure at point (B) is not available (e.g. no pressure sensor at this location), but in such cases lance tip pressure can be reasonably calculated from pressure above the melt via estimated slag density and lance tip immersion depth.

The term "acceleration section" is understood herein to mean a section of a lance in which the superficial gas velocity of feed material passing through the section changes by a factor of at least two from an inlet end to an outlet end of the section.

The lance pressure drop may be at least 1.5 bar in the solids injection lance or lances.

The lance pressure drop may be at least 2 bar in the solids injection lance or lances.

The lance pressure drop may be at least 3 bar in the solids injection lance or lances.

The operating parameters for the process to provide feed material with sufficient momentum may include positioning a lower end of the solids injection lance or each solids injection lance as close as possible to a metal/slag interface.

The operating parameters for the process to provide feed material with sufficient momentum may include selecting the operating parameters of the process, such as the slag chemistry, to promote the formation of pipe extensions of the solids injection lance or lances to thereby minimise the travel distance of injected solid material through the lance or lances and thereby facilitate positioning the lower end of the or each solids injection lance as close as possible to the metal/slag interface.

The operating parameters for the process to provide feed material with sufficient momentum may include an injection velocity of at least 40 m/s for injected feed material.

The operating parameters for the process to provide feed material with sufficient momentum may include an injection velocity of at least 50 m/s.

The operating parameters for the process to provide feed material with sufficient momentum may include an injection velocity of at least 60 m/s.

The operating parameters for the process to provide feed material with sufficient momentum may include a solids/gas ratio of injected solid feed material and carrier gas of at least 10 kg solids per $Nm^3$ gas.

The operating parameters for the process to provide feed material with sufficient momentum may include a solids/gas ratio of injected solid feed material and carrier gas of at least 15 kg solids per $Nm^3$ gas.

The solids injection lance or lances may have an internal diameter of at least 40 mm.

The solids injection lance or lances may have an internal diameter of at least 60 mm.

The solids injection lance or lances may have an internal diameter of at least 80 mm.

The solids injection lance or lances may have an internal diameter of more than 200 mm.

The solid feed material may be a solid carbonaceous material only. The solid carbonaceous material may be coal.

The solid feed material may be a solid carbonaceous material and a flux only.

The solid feed material may be a metalliferous feed material and a solid carbonaceous material.

The solid feed material may be a metalliferous feed material, a solid carbonaceous material, and a flux.

The metalliferous feed material may be an iron-containing material.

The iron-containing material may be iron ore.

The iron ore may be in the form of fines.

The metalliferous feed material and the solid carbonaceous material may be injected through the same solids injection lance or lances or through separate solids injection lances.

The metalliferous feed material may be pre-heated.

The metalliferous feed material may be at ambient temperature.

The carrier gas may be an inert gas, such as nitrogen or argon.

The penetration depth of feed material into the metal layer may at least 150 mm.

The penetration depth into the metal layer may at least 200 mm.

The penetration depth into the metal layer may at least 300 mm.

The penetration depth into the metal layer may be less than 500 mm.

The penetration depth into the metal layer may be less than 400 mm.

The metal layer depth may be at least 1 m.

The metal layer depth may be at least 1.5 m.

The metal layer depth may be less than 2.5 m.

The solids injection lance or lances may be arranged to extend downwardly into the vessel with a central axis of an outlet end of the lance or lances at an angle of 20-90 degrees to a horizontal axis.

The solids injection lances may include an opposed pair of solids injection lances that are oriented within the vessel and are arranged so that injection of feed materials via the lances forms overlapping plumes of injected feed material in the metal layer of molten bath.

The solids injection lances may include at least one pair of opposed injection lances extending downwardly and inwardly into the molten bath with longitudinal axes of the lances intersecting at a floor of the vessel or above the floor or below the floor so that plumes of injected material from the lances overlap in a central region of the metal layer that is at least 100 mm the surface of the metal layer and there is upward movement of molten material and gas from the central region of the metal layer.

The term "plumes of injected material" is understood herein to describe the streams of (a) injected feed material and (b) products produced as a result of such injection into the direct smelting vessel via the lances. In situations where the feed material includes solid carbonaceous material, the products include, by way of example, volatiles released from the carbonaceous material and reaction products such as CO and $CO_2$ and $H_2O$.

The vessel may have a diameter of at least 6 m.

The vessel may have a diameter of at least 7 m.

BRIEF DESCRIPTION OF THE DRAWINGS

The present invention is described further by way of example with reference to the accompanying drawings, a description of which follows:

FIG. 2 illustrates an example of model input parameters for a McMaster injection model; and FIG. 3 illustrates an example result of the McMaster injection model based on the input parameters in FIG. 2.

DETAILED DESCRIPTION

Figure 1:
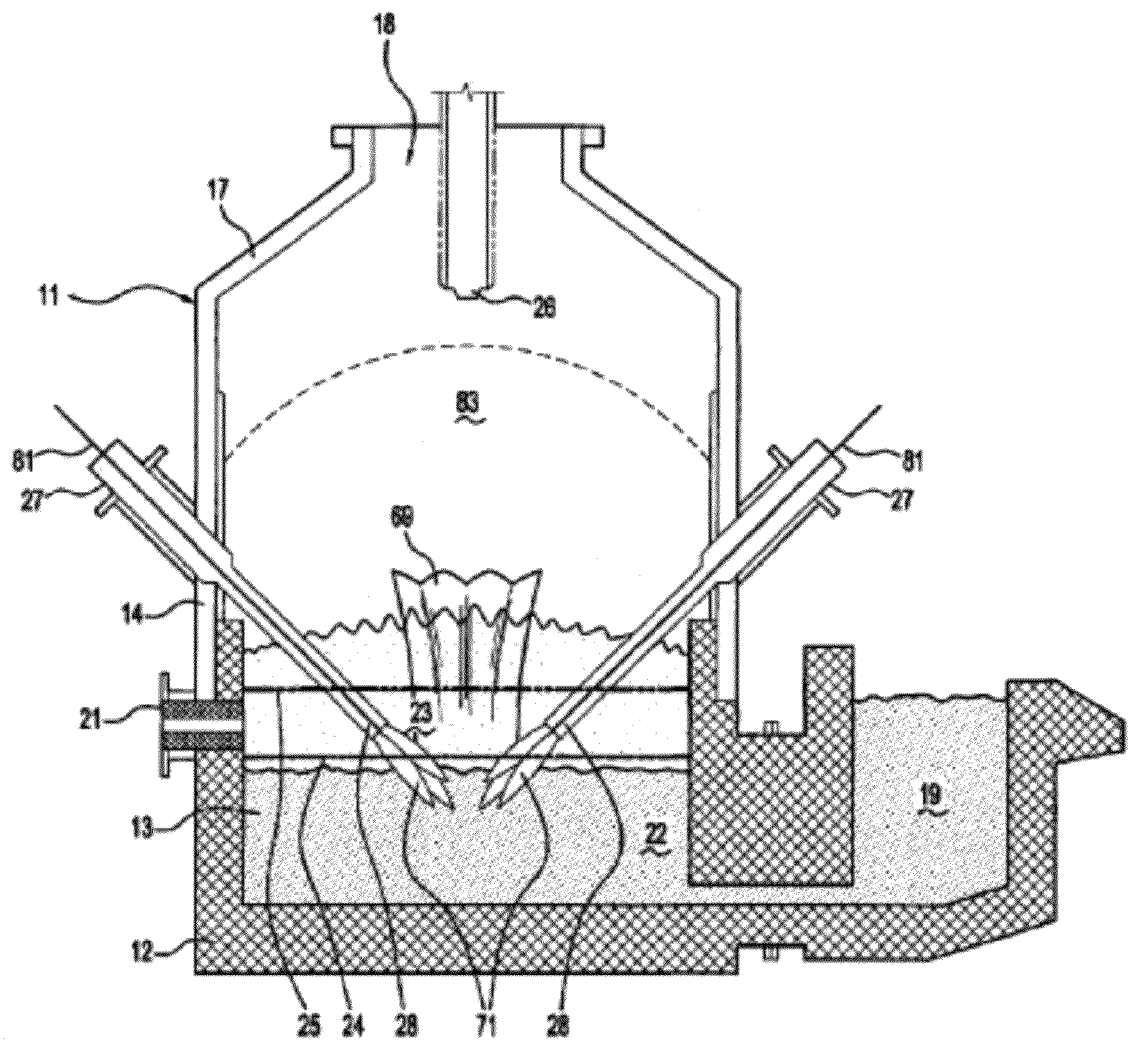
FIG. 1 illustrates a direct smelting vessel that forms a part of a plant that is suitable particularly to be used to carry out the HIsmelt process as described in International application PCT/AU96/00197.

The embodiment of the process of the present invention described hereinafter with reference to the FIG. 1 can be considered to be a form of the HIsmelt process as described in International application International application PCT/AU96/00197.

The following description is in the context of smelting metalliferous material in the form of iron ore fines, typically less than 6 mm, to produce molten iron in accordance with the HIsmelt process. However, it will be appreciated that the present invention is not confined to iron ore and is applicable to smelting any metalliferous material in any form of the material. Ore is one example of a form of metalliferous material. The invention also extends to other forms of metalliferous material, including by way of example partly reduced ores and metal-containing waste streams.

With reference to FIG. 1, the vessel 11 shown in FIG. 1 has a hearth for containing a molten bath of iron and slag that includes a base 12 and sides 13 formed from refractory bricks, a side wall 14, which forms a generally cylindrical barrel extending upwardly from the sides 13 of the hearth, and a roof 17. The side wall 14 and the roof 17 comprise water-cooled panels (not shown) for transferring heat from the side wall 14 and the roof 17. The water cooling of the panels is the main mechanism for controlling the temperature of the side wall 14 and the roof 17 and ensuring that the temperature does not increase to a level that has an impact on the integrity of the side wall 14 and the roof 15. The vessel 11 is further provided with a forehearth 19, through which molten iron is continuously discharged during smelting, and a tap-hole 21, through which molten slag is periodically discharged during smelting. The roof 17 is provided with an outlet 18 through which process off gases are discharged.

In use of the vessel 11 to smelt iron ore fines to produce molten iron in accordance with an embodiment of the process of the present invention, the vessel 11 contains a molten bath of iron and slag, which includes a layer 22 that is predominantly molten iron and a layer 23 that is predominantly molten slag on the iron layer 22. The position of a nominal quiescent surface of the iron layer 22 is indicated by numeral 24. The position of a nominal quiescent surface of the slag layer 23 is indicated by numeral 25. The term "quiescent surface" is understood to mean the surface when there is no injection of gas and solids into the vessel 11. Under normal operating conditions, the process operates in a range of pressures between 0.5 barg and 1.2 barg, and preferably between 0.6 to 1.0 barg.

The vessel 11 is provided with a plurality of solids injection lances 27 that extend downwardly and inwardly through openings (not shown) in the side wall 14 of the vessel and into the slag layer 23. The lances may be as described in more detail in U.S. Pat. No. 7,445,747 assigned to the applicant and the disclosure in the US patent is incorporated herein by cross-reference.

The lances 27 have an internal diameter of at least 40 mm and are oriented within the vessel so that outlet ends 28 of the lances 27 are above the surface of the iron layer 22 during operation of the process. This position of the lances 27 reduces the risk of damage through contact with molten metal and also makes it possible to cool the lances by forced internal water cooling without significant risk of water coming into contact with the molten metal in the vessel 11.

Preferably, the outlet ends 28 of the lances 27 are positioned as close as possible to a metal/slag interface of the molten bath having regard to safety considerations so as to minimise the travel distance and resultant loss of momentum of injected solid material into the metal layer.

The lances 27 extend downwardly and inwardly into the vessel 11, typically at an angle of 45° to a horizontal axis. The lances 27 are oriented within the vessel 11 so that longitudinal axes 81 of the lances 27 intersect in the iron layer 22 in a central region of the iron layer 22.

In use, under normal operating conditions, solid feed materials in the form of iron ore fines, solid carbonaceous material in the form of coal, and fluxes are co-injected through outlet ends 28 of the lances 27 with a carrier gas in the form of nitrogen with a solids/gas ratio of injected solid feed material and carrier gas of at least 10 kg solids per $Nm^3$ gas, an injection velocity of at least 40 m/s for injected solid feed materials and carrier gas, and a lance pressure drop of at least 1 bar in the lances 27 into the molten bath. The lance pressure drop is the pressure drop from (a) a point upstream of a lance 27 and the "acceleration section" of the lance where gas velocity is at least a factor of 2 lower than that at the outlet lance tip to (b) the outlet lance tip itself. The injected feed materials form downwardly moving plumes 71 of material that penetrate the metal layer 23 and overlap in the central region of the metal layer. These operating parameters provide the injected feed materials with sufficient momentum and/or velocity to penetrate downwardly into the iron layer 22 to a penetration depth of at least 100 mm below a nominal quiescent surface 24 of the iron layer 22 when the iron layer 22 is at least 900 mm deep, with the penetration depth being calculated using the McMaster model as described in the appendix. The applicant has found that injection of feed materials under these operating parameters makes it possible to achieve the required extent of upward flow of molten material for stable and cost effective operation of the process.

The coal is devolatilised and thereby produces gas as it moves downwardly in the molten bath. Carbon partially dissolves into the metal and partially remains as solid carbon. The iron ore is smelted to metal and the smelting reaction generates carbon monoxide gas. The gases transported into the iron layer 22 and generated via devolatilisation and smelting produce significant buoyancy uplift of molten material (including metal and slag) and solid carbon and gas from the molten bath. The buoyancy uplift generates an upward movement of splashes, droplets and streams of molten material and gas into an upper region 83, i.e. an upper gas space, of the vessel. The upper movement is shown in the FIG. 1 as a region identified by the numeral 69. The buoyancy uplift also causes substantial agitation in the molten bath and, in effect, expands the molten bath. The extent of agitation is such that there is strong mixing of the molten material within the molten bath to the extent that there is reasonably uniform temperature—typically, 1450-1550° C. with a temperature variation of the order of 50° C. throughout the molten bath. In addition, the upward movement of molten material is sufficient to the wet water-cooled panels that form the side wall 14 and the roof 17 of the vessel 11 to minimise heat loss to an extent that heat loss through the panels is less than 3000 kW/m² of panel, more preferably less than 2000 kW/m² of panel and to cause substantial agitation.

Many modifications may be made to the embodiment of the process of the present invention described above without departing from the spirit and scope of the invention.

By way of example, whilst the FIG. 1 shows a vessel 11 with a plurality of solids injection lances 27, it can readily be appreciated that the present invention extends to arrangements in which there is only one solids injection lance.

In addition, whilst FIG. 1 shows the solids injection lances 27 extending downwardly and inwardly into the vessel 11 at an angle of 45° to the horizontal axis, the present invention is not so limited and extends to arrangements in which the lances extend downwardly at any suitable angle in a range of 20-90° to the horizontal axis.

In addition, whilst the embodiment includes co-injecting ore, coal, and fluxes through the solids injection lances 27, the present invention is not so limited and extends to injecting coal and/or fluxes only through the lances 27, with ore being supplied via the top of the vessel. Such top supply of ore may include injection via lances extending downwardly through a roof or an inwardly and upwardly inclined transition between the side wall and the roof.

In addition, whilst the embodiment includes injecting hot air into the vessel, the present invention is not so limited and extends to injecting cold oxygen as the oxygen-containing gas.

APPENDIX

McMaster Injection Model

Background

Calculating how far a stream of injected solid plus carrier gas will penetrate into metal and slag is not amenable to a simple first-principle analysis. Relative to a gas-only injection situation, the presence of solids brings certain complications and the analysis becomes more difficult. Various assumptions are possible and these will lead to different results. To minimise the impact of this, it is appropriate to find the "best available calculation method" and to standardise the calculation on this basis.

The McMaster injection model is widely accepted for this purpose. It originated from McMaster University in Canada in the mid 1980's, and the underlying scientific basis (equations, assumptions etc) has been widely publicised.

Commonly cited public references are:

G A Irons and L R Farias, *The Influence of Lance Orientation and Gas Evolution on Particle-Liquid Contact During Submerged Power Injection*, Canadian Metallurgical Quarterly, Vol 25, No 4, pp 297-306, 1986

L R Farias and G A Irons, *A Unified Approach to Bubbling-Jetting Phenomena in Powder Injection into Iron and Steel*, Metallurgical Transactions B, Volume 16B, June 1985, pp 211-225

Irons, G. A., 1992. *"Fundamental Aspects of Solids Injection for Bath Smelting"*, Savard/Lee International Symposium on Bath Smelting, October 18-22, Montreal, QC, The Metallurgical Society and The Iron and Steel Society of AIME, and CIM pp. 493-506

The original work at McMaster University (by two post-doctoral fellows, Drs. L R Farias and H Gou under supervision of Prof G A Irons) used a Fortran model for the injection process to calculate performance. It is this original McMaster Fortran code, translated into C# and re-coded in a Windows environment (with rigorous testing by G A Irons to ensure fidelity), that forms the basis of the current McMaster Injection model. This is taken to represent "best practice" calculation methodology. HIsmelt has also extended the model for conditions relevant to their process.

The aim is to use this model as a general tool to calculate penetration distances of solids plus carrier gas into metal and slag. Others may chose to repeat these calculation themselves (using the same inputs, methodology and assumptions), thus arriving at the same results. However, to avoid the need for this type of recalculation (which can be onerous and time-consuming), the intention is to make the software available (promptly and free of charge) to any interested party.

Model Parameters

FIG. 2 shows the model inputs needed. Explanation of each of the numbered inputs is shown, and five of these (inputs 32-36) require additional explanation (see below).

Input 32: Explanation A

The input "Acceleration Time Factor" is a parameter which describes how fast solids approach their ultimate velocity in the gas stream. For each particle size/density fraction there is an ultimate velocity which corresponds to gas velocity minus the terminal velocity of that particle type (alone) in the gas medium. In practice, particles tend to cluster together and quite long acceleration distances may be needed to approach this ultimate velocity. The "Acceleration Time Factor" parameter allows the user to adjust the degree of particle acceleration achieved in a given distance (which usually equates to lance length, input 3). The calculation for an individual particle size/density is as follows:

$$\text{Tip solid velocity} = (\text{tip gas velocity}) - (\text{particle terminal velocity}) \times e^{-(\text{lance length})/(\text{time constant})}$$

Where the time constant is defined as:

$$\text{time constant} = (\text{Acceleration Time Factor}) \times (\text{particle size in micron})/100$$

The higher the "Acceleration Time Factor", the slower the particles are at the lance tip. For the purpose of this calculation, acceleration time factor numerical value settings are restricted to the range 1-2.

Inputs 33 & 34: Explanations B & C

Injected solids are, depending on their nature, able to react with metal and slag. In particular, coal is able to devolatilise and iron ore is able to smelt (in carbon-containing metal) to generate CO gas. It is therefore possible that incoming solids, as they enter the metal, could encounter a gas-liquid suspension (from previously injected solids) in their target "impact" zone. The model describes this by allowing the user to switch on (or off) an option to have "bubbly" metal in the target area (input 33 check box). If this option is "on" (i.e. checked), then the model uses the voidage percentage (specified immediately below as input 34) to modify the density of the target metal according to:

Effective metal density=(density from input 11)×(1−(voidage percentage)/100)

The result is that the plume penetrates more deeply as target zone voidage increases. For direct smelting this assumption is standardised (as shown) at "Generate Gas Bubbles in Target Zone" checked (activated) and 50% voidage in the target zone.

Inputs 35 & 36: Explanations D & E

At times, a user may wish to specify directly the average solids velocity at the lance tip. The model allows this by providing an option to bypass the acceleration calculation described above. To use this option the user needs to un-check input 35 ("Use Auto Acceleration Percentage") and specify directly in input 36 (i.e. the text box immediately below) what percentage of the tip gas velocity is to be assigned to the solids.

Standard use of the model involves using input 35 activated (checked) as shown, and allowing the model to calculate the average percentage of tip gas velocity that is achieved by the solids.

Model results for the input conditions shown in FIG. 2 are given in FIG. 3.

"Metal Penetration" is defined as the calculated maximum depth of penetration into the metal layer along the curved centreline of the injection plume (shown as a black line in the middle of the red plume).

The invention claimed is:

1. A molten bath-based process for direct smelting metalliferous material and producing molten metal in a direct smelting vessel that contains a molten bath that has a metal layer that is at least 900 mm deep, comprising:
selecting operating parameters of the process so that feed material including solid material and carrier gas is injected from above the metal layer into the metal layer via at least one solids injection lance with sufficient momentum to penetrate to a depth of at least 100 mm below a nominal quiescent surface of the metal layer to cause upward movement of molten material and gas from the metal layer; and
injecting the feed material via the at least one solids injection lance according to the selected operating parameters, thereby causing upward movement of molten material and gas from the metal layer.

2. The process defined in claim 1 wherein the operating parameters include injecting feed material with a lance pressure drop of at least 1 bar in the solids injection lance or lances.

3. The process defined in claim 1 wherein the operating parameters include injecting feed material with a lance pressure drop of at least 1.5 bar in the solids injection lance or lances.

4. The process defined in claim 1 wherein the operating parameters include injecting feed material with a lance pressure drop of at least 2 bar in the solids injection lance or lances.

5. The process defined in claim 1 wherein the operating parameters include positioning a lower end of the solids injection lance or lances as close as possible to a metal/slag interface.

6. The process defined in claim 1 wherein the operating parameters include an injection velocity of at least 40 m/s for injected feed material.

7. The process defined in claim 1 wherein the operating parameters include an injection velocity of at least 50 m/s for injected feed material.

8. The process defined in claim 1 wherein the operating parameters include a solids/gas ratio of injected solid feed material and carrier gas of at least 10 kg solids per $Nm^3$ gas.

9. The process defined in claim 1 wherein the operating parameters include a solids/gas ratio of injected solid feed material and carrier gas of at least 15 kg solids per $Nm^3$ gas.

10. The process defined in claim 1 wherein the solid feed material includes a metalliferous feed material and a solid carbonaceous material.

11. The process defined in claim 10 wherein the metalliferous feed material includes an iron-containing material.

12. The process defined in claim 10 wherein the solid carbonaceous material includes coal.

13. The process defined in claim 1 wherein the penetration depth of feed material into the metal layer is at least 150 mm.

14. The process defined in claim 1 wherein the metal layer depth in the metal layer is at least 1 m.

15. The process defined in claim 1 wherein the solids injection lance or lances are arranged to extend downwardly into the vessel with a central axis of an outlet end of the lance or lances at an angle of 20-90 degrees to a horizontal axis.

16. The process defined in claim 1 wherein the solids injection lances include an opposed pair of solids injection lances that are oriented within the vessel and are arranged so that injection of feed materials via the lances forms overlapping plumes of injected feed material in the metal layer of the molten bath.

17. The process defined in claim 1 wherein the solids injection lances include at least one pair of opposed injection lances extending downwardly and inwardly into the molten bath with longitudinal axes of the lances intersecting at a floor of the vessel or above the floor or below the floor so that plumes of injected material from the lances overlap in a central region of the metal layer that is at least 100 mm the surface of the metal layer and there is upward movement of molten material and gas from the central region of the metal layer.

18. The process defined in claim 1 wherein the vessel has a diameter of at least 6 m.

19. The process defined in claim 1 wherein selecting the operating parameters comprises calculation of the penetration depth to be achieved by the operating parameters.

20. The process defined in claim 1 wherein selecting the operating parameters is based on factors including an acceleration time factor.

21. The process defined in claim 1 wherein selecting the operating parameters is based on factors including a velocity of solids as a percentage of gas velocity.

22. A molten bath-based process for direct smelting metalliferous material and producing molten metal in a direct smelting vessel that contains a molten bath that has a metal layer that is at least 900 mm deep, comprising:
selecting operating parameters of the process so that feed material including solid material and carrier gas is injected from above the metal layer into the metal layer via at least one solids injection lance with sufficient momentum to penetrate to a penetration depth of at least 100 mm below a nominal quiescent surface of the metal layer to cause upward movement of molten material and gas from the metal layer, wherein selecting the operating parameters comprises calculation of the penetration depth to be achieved by the operating parameters;

injecting the feed material via the at least one solids injection lance according to the operating parameters selected, thereby causing upward movement of molten material and gas from the metal layer.

* * * * *